(12) United States Patent
Sanger (10) Patent No.: US 6,710,795 B2
(45) Date of Patent: Mar. 23, 2004

(54) TUNING A PRINTER BY PRINTING PATTERNS WHICH BEAT AGAINST A SPATIAL FREQUENCY OF A COMPONENT WITHIN THE PRINTER

(75) Inventor: Kurt M. Sanger, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 170 days.

(21) Appl. No.: 09/832,746

(22) Filed: Apr. 11, 2001

(65) Prior Publication Data

US 2002/0196326 A1 Dec. 26, 2002

(51) Int. Cl.$^7$ ................................................ B41J 2/47
(52) U.S. Cl. ....................................... 347/240; 347/251
(58) Field of Search ................................. 347/116, 234, 347/240, 248, 251, 253, 262, 264, 235, 237; 358/1.8

(56) References Cited

U.S. PATENT DOCUMENTS

| | | | |
|---|---|---|---|
| 4,989,019 A | * 1/1991 | Loce et al. ................. | 347/234 |
| 5,268,708 A | 12/1993 | Harshbarger et al. ........ | 346/134 |
| 5,329,297 A | 7/1994 | Sanger et al. ................ | 347/251 |
| 5,430,472 A | * 7/1995 | Curry ........................... | 347/232 |
| 5,737,006 A | * 4/1998 | Wong ........................... | 347/235 |
| 6,137,592 A | * 10/2000 | Arquilevich et al. .......... | 358/1.8 |
| 6,411,322 B1 | * 6/2002 | Stanich ........................ | 347/240 |

OTHER PUBLICATIONS

GAFT Process Controls Product Catalog; Graphic Arts Technology Foundation; 1999.

F. L. Van Nes and M. A. Bouman; The Effects of Wavelength and Luminance on Visual Modulation Transfer; International Congress Ser. 125, 1965, pp. 183–192.

* cited by examiner

*Primary Examiner*—Hai Pham
(74) *Attorney, Agent, or Firm*—Nelson Adrian Blish (57) ABSTRACT

A method of tuning a printer by printing a pattern, which beats against a component within the printer includes designing a first pattern, which has a spatial frequency, which is different from a first component spatial frequency. A first pattern is printed and banding is measured. To minimize banding a characteristic of the first component is adjusted.

10 Claims, 10 Drawing Sheets

TUNING A PRINTER BY PRINTING PATTERNS WHICH BEAT AGAINST A SPATIAL FREQUENCY OF A COMPONENT WITHIN THE PRINTER

FIELD OF THE INVENTION

This invention relates to printers in general and in particular to tuning a printer by printing patterns which beat against a spatial frequency of components within the printer.

BACKGROUND OF THE INVENTION

Pre-press color proofing is a procedure that is used by the printing industry for creating representative images of printed material without the high cost and time that is required to actually produce printing plates and set up a high-speed, high-volume printing press to produce an example of an intended image. These intended images may require several corrections and be reproduced several times to satisfy customers' requirements, which results in loss of profits. By utilizing pre-press color proofing, time and money can be saved.

One such commercially available image-forming apparatus, which is depicted in commonly assigned U.S. Pat. No. 5,268,708, is an image forming apparatus having halftone color proofing capabilities. This image forming apparatus is arranged to form an intended image on a sheet of thermal print media by transferring colorant from a sheet of colorant donor material to the thermal print media by applying a sufficient amount of thermal energy to the colorant donor material to form an intended image. This image forming apparatus is comprised generally of a material supply assembly or carousel; lathe bed scanning subsystem, which includes a lathe bed scanning support frame, translation drive, translation stage member, printhead, and imaging drum; and thermal print media and colorant donor material exit transports.

A printer is comprised of numerous subsystems each of which have spatial harmonics, which may cause errors in printing. For example, the drum on which a donor and receiver rest rotates at a certain frequency. A motor, which drives a lead screw on which a printhead is mounted, rotates at a certain frequency. These harmonic frequencies, which are innate to the components of the printer, may cause undesirable banding or artifacts in the image which is printed.

There are many examples of using two frequencies beating against each other to measure time, frequency, and distance. For example:

A Vernier beats two scales against each other. A micrometer uses this to make a finer measurement than either of the two scales alone could produce.

Wagon wheels on television beat against the frame rate. If they match the frame rate they appear to be stopped even though the wagon is moving.

A stroboscope flashes a light at a constant rate. If the item of interest appears stopped it is moving at a multiple rate of the strobe light.

A musical tuner may use a strobing light driven by an input audio frequency with a spinning wheel encoded with a pattern that represents the beat frequency of different musical notes. When the input tone frequency matches the frequency of the pattern on the wheel, the wheel appears to be stopped. If the tone is flat or sharp the pattern walks one way or the other. The direction of the walking pattern indicates flatness or sharpness of the musical note.

A strobe light on the side of a record player indicates that the platter is spinning at the correct speed by beating against the pattern on the platter. If the platter is too fast or too slow the pattern on the platter will walk one way or the other.

Amplitude Modulation beats a carrier frequency against a signal to demodulate the radio signal to audible frequencies.

Figure 3:
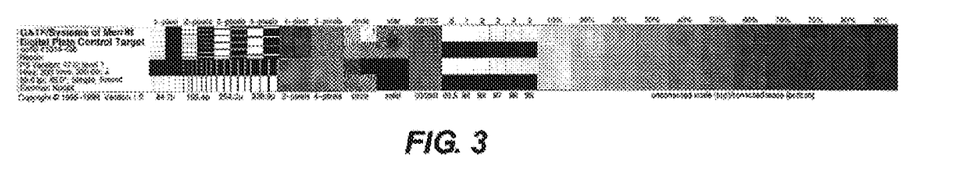
FIG. 3 GATF/Systems of Merritt Digital Plate Control Target.
Figure 4:
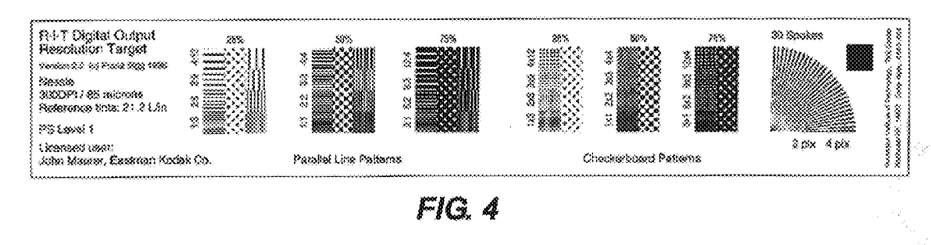
FIG. 4 RIT Digital Output Resolution Target.

Printed test targets which are used to calibrate printers do not purposely beat against the spatial harmonics of the printer. Graphic Arts Technical Foundation, GATF, publishes a number of digital test targets. GATF Digital Test Form contains color patches, Modulation Transfer Function (MTF) Targets, text, halftone tints, resolution targets, and checkerboards and lines composed of discrete numbers of pixels. "GAFT Process Controls Product Catalog", 1999, Graphics Art Technology Foundation, 200 Deer Run Road, Sewickley, Pa., 15413-2600. The GATF Systems of Merit Digital Plate Control Target, FIG. 3, consists of checkerboards composed of discrete numbers of pixels, lines composed using discrete numbers of pixels, MTF Targets, and halftone tints with and without dot gain compensation. Similarly the Rochester Institute of Technology Digital Output Resolution Target Version 2.2, FIG. 4, contains horizontal lines, vertical lines, and squares composed of discrete numbers of pixels, along with a spoke wheel MTF target. While all of these test targets measure printer performance, they do not identify the source or component within the printer that is responsible for poor performance.

SUMMARY OF THE INVENTION

Briefly, according to one aspect of the present invention a method of tuning a printer by printing a pattern, which beats against a component within the printer comprises designing a first pattern, which has a spatial frequency, which is different from a first component spatial frequency. A first pattern is printed and the resultant banding is measured. To minimize banding a characteristic of the first component is adjusted.

Each printer has numerous subsystems which have spatial harmonics which may contribute to errors in the print. This invention is the technique of perturbing the printer, imaging a test pattern or image that is designed to beat against the spatial harmonic of interest, and using the results to tune the subsystem or select the settings of the printer to reduce the artifact resulting in a better printing system. The principle is the same as that used in a micrometer to measure small distances. Here the printer images a pattern which beats against a component of the printer resulting in a low frequency beat pattern which is visible to the eye.

The present invention uses this technique to adjust the angle of the printhead and to optimize the balance amongst multiple writing channels. The present invention also uses this technique to judge the quality of printer translation subsystems. The present invention also is used to measure printer drum flutter at less than 0.05%. Finally, the present invention is used to select the number of channels to image a given halftone line screen.

The invention and its objects and advantages will become more apparent in the detailed description of the preferred embodiment presented below.

DETAILED DESCRIPTION OF THE INVENTION

The present description will be directed in particular to elements forming part of, or cooperating more directly with, apparatus in accordance with the present invention. It is to be understood that elements not specifically shown or described may take various forms well known to those skilled in the art.

Figure 1:
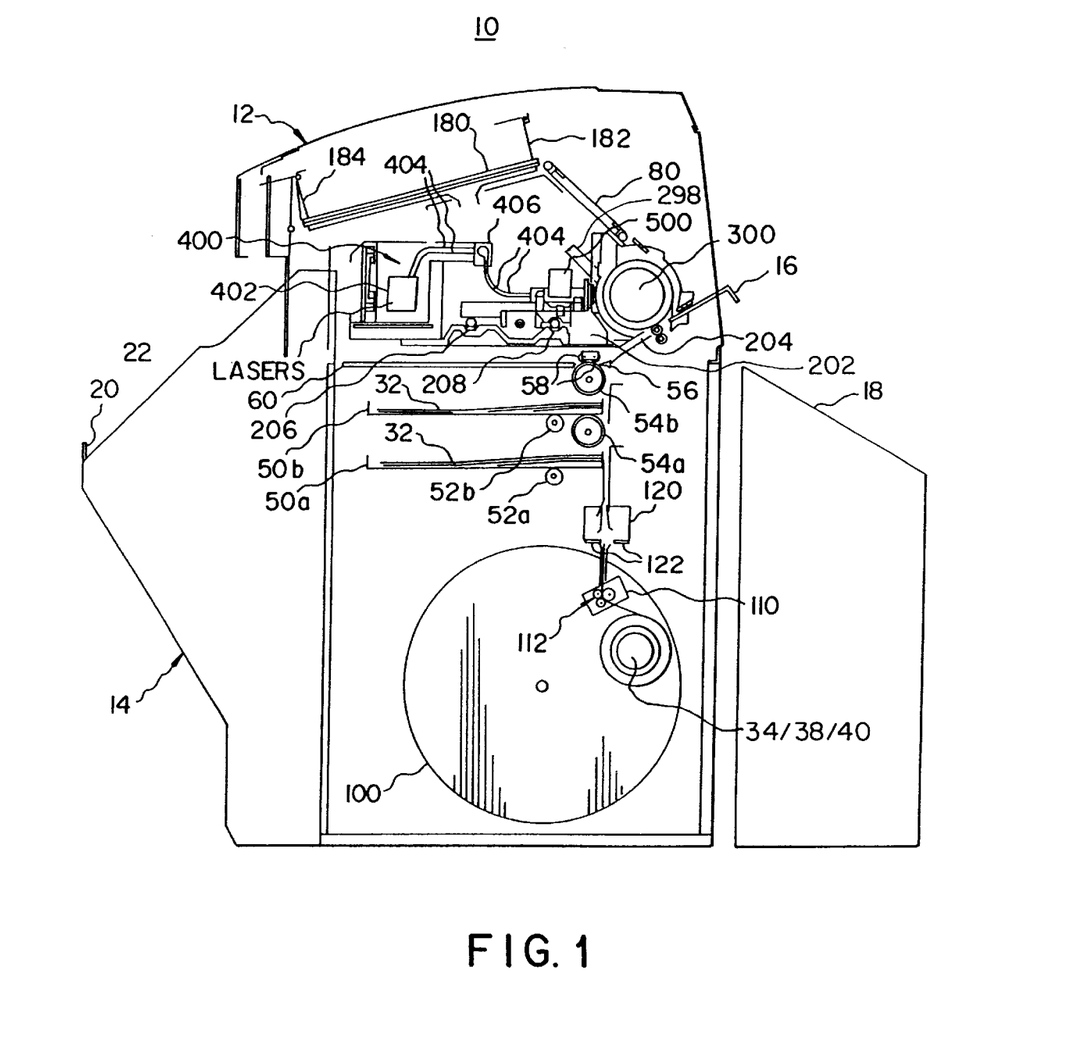
FIG. 1 is an elevational view in vertical cross section of an image forming apparatus of the present invention.

Referring to FIG. 1, there is illustrated an image forming apparatus 10 according to the present invention having an image processor housing 12, which provides a protective cover. A movable, hinged image processor door 14 is attached to the front portion of the image processor housing 12 permitting access to the two sheet material trays, lower sheet material tray 50a and upper sheet material tray 50b, that are positioned in the interior portion of the image processor housing 12 for supporting thermal print media 32 thereon. Only one of the sheet material trays will dispense the thermal print media 32 out of its sheet material tray 50 to create an intended image thereon; the alternate sheet material tray either holds an alternative type of thermal print media 32 or functions as a back up sheet material tray. In this regard, the lower sheet material tray 50a includes a lower media lift cam 52a for lifting the lower sheet material tray 50a and ultimately the thermal print media 32, upwardly toward a rotatable, lower media roller 54a and toward a second rotatable, upper media roller 54b which, when both are rotated, permits the thermal print media 32 to be pulled upwardly towards a media guide 56. The upper sheet material tray 50b includes a upper media lift cam 52b for lifting the upper sheet material tray 50b and ultimately the thermal print media 32 towards the upper media roller 54b, which directs it towards the media guide 56.

The movable media guide 56 directs the thermal print media 32 under a pair of media guide rollers 58, which engages the thermal print media 32 for assisting the upper media roller 54b in directing it onto the media staging tray 60. The media guide 56 is attached and hinged to the lathe bed scanning frame 202 at one end, and is uninhibited at its other end for permitting multiple positioning of the media guide 56. The media guide 56 then rotates its uninhibited end downwardly, as illustrated in the position shown, and the direction of rotation of the upper media roller 54b is reversed for moving the thermal print medium receiver sheet material 32 resting on the media staging tray 60 under the pair of media guide rollers 58, upwardly through an entrance passageway 204 and around a rotatable vacuum imaging drum 300.

Continuing with FIG. 1, a roll of colorant donor material 34 is connected to the media carousel 100 in a lower portion of the image processor housing 12. Four rolls are used, but only one is shown for clarity. Each roll includes a colorant donor material 34 of a different color, typically black, yellow, magenta and cyan. These colorant donor materials 34 are ultimately cut into colorant donor materials and passed to the vacuum imaging drum 300 for forming the medium from which colorants imbedded therein are passed to the thermal print media 32 resting thereon, which process is described in detail herein below. In this regard, a media drive mechanism 110 is attached to each roll of colorant donor material 34, and includes three media drive rollers 112 through which the colorant donor material 34 of interest is metered upwardly into a media knife assembly 120. After the colorant donor material 34 reaches a predetermined position, the media drive rollers 112 cease driving the colorant donor material 34 and the two media knife blades 122 positioned at the bottom portion of the media knife assembly 120 cut the colorant donor material 34 into colorant donor sheet materials. The lower media roller 54a and the upper media roller 54b along with the media guide 56 then pass the colorant donor sheet material onto the media staging tray 60 and ultimately to the vacuum imaging drum 300 and in registration with the thermal print media 32 using the same process as described above for passing the thermal print media 32 onto the imaging drum 300. The colorant donor sheet material now rests atop the thermal print media 32 with a narrow gap between the two created by microbeads imbedded in the surface of the thermal print media 32.

A laser assembly 400 includes several lasers 402. Laser diodes within the laser assembly are connected via fiberoptic cables 404 to a distribution block 406 and ultimately to the printhead 500. They can be individually modulated to supply energy to selected areas of the thermal print media in accordance with an information signal. The printhead 500 includes a plurality of optical fibers coupled to the laser diodes at one end and at and opposite end to a fiber-optic array within the printhead. The printhead is movable relative to the longitudinal axis of the imaging drum. The printhead 500 directs thermal energy received from the lasers, causing the colorant donor sheet material to pass the desired color across the gap to the thermal print media 32. The printhead 500 is attached to a lead screw 250 via the lead screw drive nut 254 and drive coupling for permitting movement axially along the longitudinal axis of the vacuum imaging drum 300 for transferring the data to create the intended image onto the thermal print media 32. A vacuum imaging drum is shown.

For writing, the vacuum imaging drum 300 rotates at a constant velocity, and the printhead 500 begins at one end of the thermal print media 32 and traverses the entire length of the thermal print media 32 for completing the transfer process for the particular colorant donor sheet material resting on the thermal print media 32. After the printhead 500 has completed the transfer process for the particular colorant donor sheet material resting on the thermal print media 32, the colorant donor sheet material is then removed from the imaging drum 300 and transferred out the image processor housing 12 via a skive or ejection chute 16. The colorant donor sheet material eventually comes to rest in a waste bin 18 for removal by the user. The above described process is then repeated for the other three rolls of colorant donor materials 34.

After the color from all four sheets of the colorant donor materials has been transferred and the colorant donor materials have been removed from the vacuum imaging drum 300, the thermal print media 32 is removed from the vacuum imaging drum 300 and transported via a transport mechanism 80 to a color binding assembly 180. The entrance door 182 of the color binding assembly 180 is opened for permitting the thermal print media 32 to enter the color binding assembly 180, and shuts once the thermal print media 32 comes to rest in the color binding assembly 180. The color binding assembly 180 processes the thermal print media 32 for further binding the transferred colors on the thermal print media 32 and for sealing the microbeads thereon. After the color binding process has been completed, the media exit door 184 is opened and the thermal print media 32 with the intended image thereon passes out of the color binding assembly 180 and the image processor housing 12 and comes to rest against a media stop 20.

Figure 2:
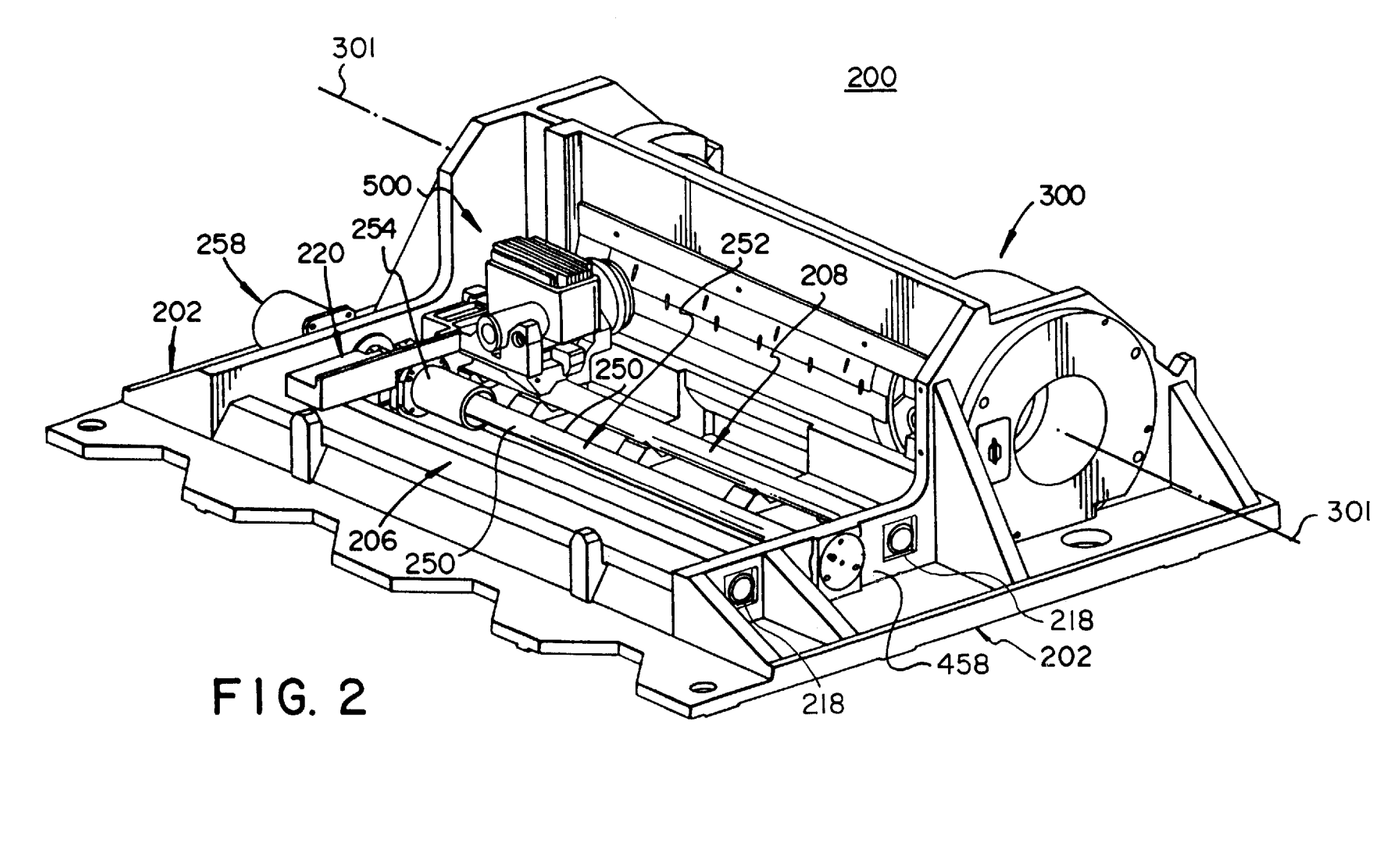
FIG. 2 shows a perspective view of a lathe bed scanning subsystem, or write engine, of the present invention.

Referring to FIG. 2, there is illustrated a perspective view of the lathe bed scanning subsystem 200 of the image forming apparatus 10, including the imaging drum 300, printhead 500 and lead screw 250 assembled in the lathe bed scanning frame 202. The imaging drum 300 is mounted for rotation about an axis X in the lathe bed scanning frame 202. In the preferred embodiment shown, the translation bearing rods 206, 208 are arranged parallel with axis X of the imaging drum 300, with the axis of the printhead 500 perpendicular to the axis X of the imaging drum 300. The printhead 500 is movable with respect to the imaging drum 300, and is arranged to direct a beam of light to the colorant donor sheet material. The beam of light from the printhead 500 for each laser 402 is modulated individually by modulated electronic signals from the image forming apparatus 10, which are representative of the shape and color of the original image, so that the color on the colorant donor sheet material is heated to cause volatilization only in those areas in which its presence is required on the thermal print media 32 to reconstruct the shape and color of the original image.

The printhead 500 is mounted on a movable translation stage member 220 which, in turn, is supported for low friction slidable movement on translation bearing rods 206 and 208. The front translation bearing rod 208 locates the translation stage member 220 in the vertical and the horizontal directions with respect to axis X of the vacuum imaging drum 300. The rear translation bearing rod 206 locates the translation stage member 220 only with respect to rotation of the translation stage member 220 about the front translation bearing rod 208, so that there is no overconstraint condition of the translation stage member 220 which might cause it to bind, chatter, or otherwise impart undesirable vibration to the printhead 500 during the generation of an intended image.

Continuing with FIG. 2, the translation bearing rods 206, 208 are positioned and supported at their ends by rod support bores 218 in the outside walls 458 of the lathe bed scanning frame 202. Each rod support bore supports an end of a translation bearing rod. The rod support bores 218 are machined into the walls of the lathe bed scanning support frame 202 to allow adjustment of the translation bearing rods 206 and 208. The rod support bores 218 may comprise notches in an appropriate direction at one or both ends of the translation bearing rod. The notches are adapted for allowing adjustment of the translation bearing rods to compensate for manufacturing defects in the translation bearing rod.

Referring to FIG. 2 a lead screw 250 is shown which includes an elongated, threaded shaft 252 which is attached to the linear drive motor 258 on its drive end and to the lathe bed scanning frame 202 by means of a radial bearing. The linear drive motor 258 is also called a translation motor. A lead screw drive nut 254 includes grooves in its hollowed-out center portion for mating with the threads of the threaded shaft 252 for permitting the lead screw drive nut 254 to move axially along the threaded shaft 252 as the threaded shaft 252 is rotated by the linear drive motor 258. The lead screw drive nut 254 is integrally attached to the to the printhead 500 through the lead screw coupling 256 (not shown) and the translation stage member 220 at its periphery so that as the threaded shaft 252 is rotated by the linear drive motor 258 the lead screw drive nut 254 moves axially along the threaded shaft 252 which in turn moves the translation stage member 220 and ultimately the printhead 500 axially along the vacuum imaging drum 300.

For a printer writing with 28 writing channels there would be 28 lasers 402, coupled through 28 fiber optics 404 creating 28 writing spots imaged by printhead 500 onto the donor 34 which is loaded onto the drum 300. The linear drive motor 258 is commanded to move the printhead 500 the distance of 28 lines per revolution of the drum 300. Such a printer would have an error distribution which repeats at a spatial frequency of 28 lines caused by slight imperfections in the arrangement and intensity of writing spots projected by printhead 500.

For a leadscrew 250 with a threaded shaft 252 which has a pitch of 16 mm per revolution there would be a spatial error at the rate of once per revolution of the leadscrew resulting in a prominent spatial frequency of $\frac{1}{16}$ cycles/mm. This leadscrew will also have error components at harmonics of each revolution resulting in errors at spatial frequencies of twice per revolution, and four times per revolution etc.

For a linear drive motor 258, such as a Vexta Model Number PH268M-E1.5B-C10, consisting of a two phase stepper motor with 100 poles per revolution there will 400 steps per revolution of the motor. Slight inaccuracies in each phase will result in spatial errors at the rate of 400 steps/rev x (1 rev/lead screw pitch). For a 16 mm leadscrew, such as a Kirk VHD12000 Series Leadscrew, and a 100 pole 2 phase stepper motor the spatial error frequency will be 25 cycles/mm. This linear drive system will also have harmonics at the rate of every other step, and every fourth step etc.

The drum 300 is driven by a motor, such as Hathaway Model Number BH03403, not shown, which will have poles causing a spatial error frequency in the drum direction. The bearings on the drum 300, the bearings on the linear drive motor 258, the number of threads in the lead screw drive nut 254, will all contribute an amount of error which will result in spatial frequencies in the final image. One skilled in the art will recognize that there are numerous sources of error in such an image processing device. One will also recognize that many of these error sources will be repetitive and cause a repeating error which results in a spatial frequency in the final image.

This invention utilizes the principle that when you multiply two cosine waves together you get an output signal that is composed of the sum and difference of the frequencies in the original cosine wave. Therefore, if the frequency of the two cosine waves is the same, the difference frequency is 0 cycles per second or a DC, Direct Current, signal. If the two frequencies differ by 1 cycle per second then you obtain the difference frequency of 1 cycle per second. Mathematically this may be described using the Fourier Integral. The Fourier transform of a cosine wave, $\cos(\omega_0 t)$, is a delta function which is true at $\omega=\omega_0$ represented as $\delta(\omega-\omega_0)$. The Convolution Theorem of the Fourier Integral shows that a multiplication of two signals in time domain is the convolution of Fourier Series of each signal in the frequency domain. Therefore $\cos(\omega_0 t) \times \cos(\omega_1 t)$ becomes $\delta(\omega-\omega_0)*\delta(\omega-\omega_1)$ which is $\delta(\omega-(\omega_0-\omega_1))+\delta(\omega-(\omega_0+\omega_1))$ which converts back to $\cos((\omega_0-\omega_1)t)+\cos((\omega_0-\omega_1)t)$.

The present invention applies the Fourier Integral in analyzing the image created on a printer. However, we replace the variable t which normally represents time with the distance, x, which is measured in mm. The frequency ω represents cycles per mm instead of cycles per second. One skilled in the Fourier Integral will easily recognize that we may apply these principles in two directions, x and y. We therefore have $\omega_x$ and $\omega_y$, which represent spatial frequencies in the x and y directions respectively.

The simplest embodiment of the present invention utilizes a pattern which beats in one direction. This pattern is labeled the PseudoX image. This image is similar to a halftone pattern made up of lines instead of dots. The X in the pattern name represents the number of lines that the pattern repeats over. For instance a Pseudo29 pattern, FIG. 5, will repeat every $29^{th}$ line. In the Y direction we change the number of lines which are on and off in the pattern.

Figure 5:
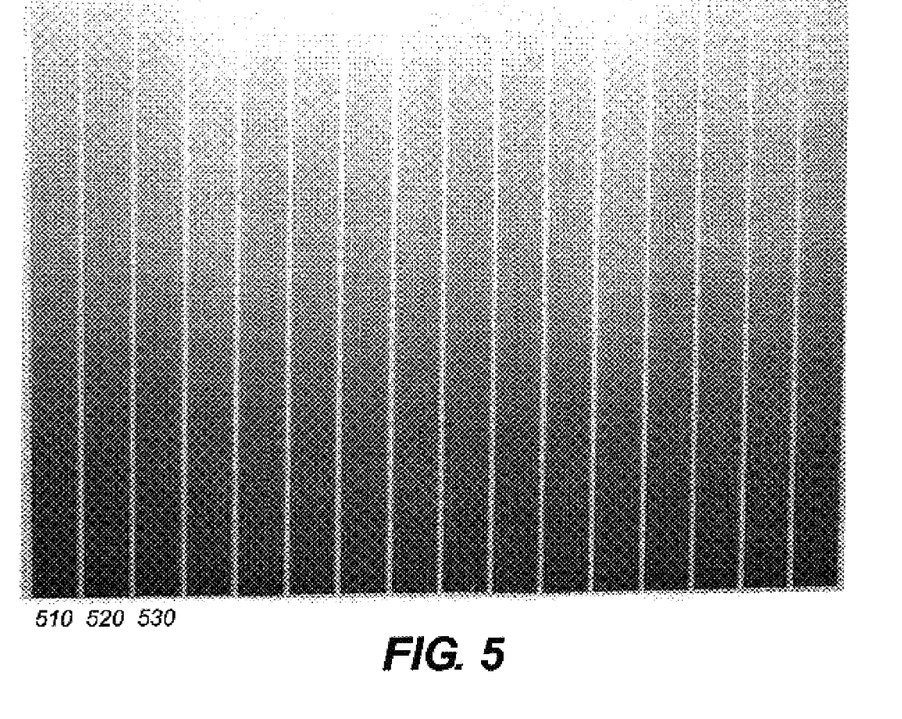
FIG. 5 Pseudo29 Image on Kodak Approval XP with Changing Head Angle.

For a Pseudo29 pattern the image consists of 29 patches. The first patch, 510, is a solid with all 29 lines turned on. The second patch, 520, turns one line off out of every $29^{th}$ line. The third patch, 530, turns two lines off out of every $29^{th}$ line. The fourth patch, 540, turns three lines off out of every $29^{th}$ line. Similarly each patch turns (Patch −1) lines off out of every $29^{th}$ line such that the $29^{th}$ patch, 550, turns one line on out of every $29^{th}$ line.

When this image is imaged on a printer that uses 28 writing channels, patches 2 through 29 beat against the 28 writing channels. The expected beat period is 28 times 29 lines wide. For instance on the first pass channel 1 in patch 2 may be off. On the second pass channel 2 in patch 2 will be off. On the third pass channel 3 in patch 2 will be off. This progresses through pass 29 where channel 1 in patch 2 is again off. This pattern continues for the number of lines imaged. For the preferred embodiment of the invention, the pattern is 25 mm wide. The wider the image the easier it is to detect the low frequency beat pattern. The same pattern may be imaged over the whole width of the printer.

Note that creating an extremely low frequency is not the goal. Rather the goal is to create a beat frequency that is easily detected. The contrast sensitivity curve of the human eye shows a peak in eye sensitivity at around 4 cyc/mm at normal viewing distances. See F. L. Van Nes and M. A. Bouman, "The Effects of Wavelength and Luminance on Visual Modulation Transfer," Proc SPIE Symposium on Performance of the Eye at Low Luminance, Excerpta Media, International Congress Serial 125, (1965). For instance if the beat frequency of the Pseudo29 beating against 28 writing channels is too fast, a Pseudo57 pattern may be used to beat 57 image lines against the 28 writing channels producing a beat period of 28 times 57 lines.

While this example shows that we expect a beat frequency of: Writing Resolution (lines/mm)/(Number of Lines in the pattern times the Number of Writing Channels) this technique may be used to study other harmonics of the component under test. For instance we may have a lens fall off from center to edge may be modeled as a first harmonic of the 28 writing channels. The first harmonic will have a spatial period of 14 writing channels. Using a pattern which is 15 lines wide would beat against the first harmonic of the 28 writing channels imaged at 2540 lines per inch creating an expected beat frequency of:

Equation 1: Predicted Beat Frequency of a Pattern Beating Against an N-Channel Printer.

$$BeatFrequency(cyc/mm) = WritingResolution(dp\ mm) \times \frac{1 cycle}{LinesInPattern \times ChannelsInPrinter}$$

Where:
Beat Frequency is in cycles/mm
Writing Resolution is in dots per mm
Lines In Pattern is the number of lines before the pattern repeats.
Channels in Printer are the number of writing channels.

From Van Ness and Bauman we realize that the highest spatial frequency we may see is about 4 cyc/mm and the lowest frequency is on the order of 0.04 cyc/mm. Therefore it is advantageous for the pattern to be designed to result in a beat frequency of between 0.04 cyc/mm and 4 cyc/mm so that it may be viewed with the unaided human eye.

While in this preferred embodiment we image multiple patches in the Y direction it is not necessary to do so. For instance we create Line29 images which consist of 1 line on out of every $29^{th}$ line for the whole image. Such an image is created at the maximum size of the printer.

Figure 6:
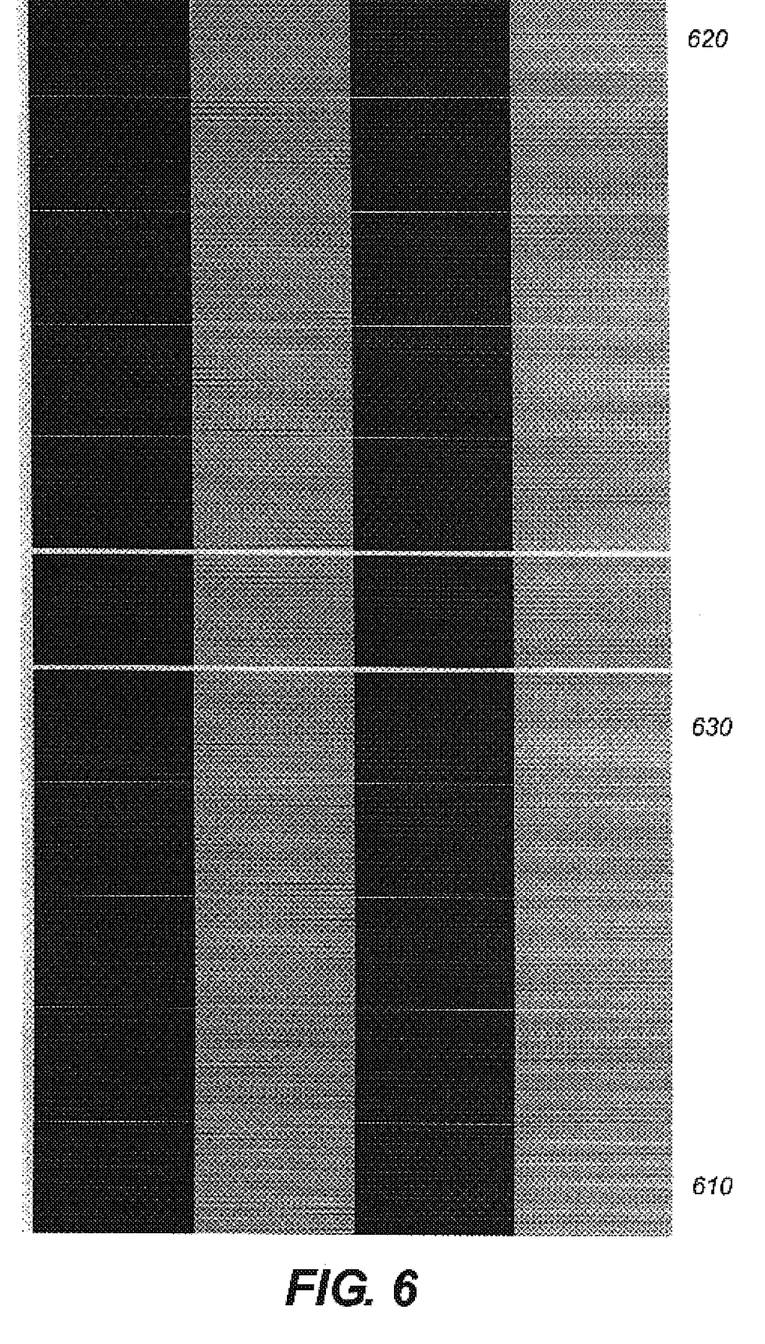
FIG. 6 Pseudo19 Image with Patches of 1 line off, 2 lines on, 2 lines off, and 1 line on Imaged on Kodak Approval PS while Varying Translation Speed.

FIG. 6 shows a Pseudo19 Image printed on an Approval PS printer with 18 writing channels while changing the translation move. Column 1, 610, is created by imaging with a translation speed which is too slow, resulting in a overlap or dark image inbetween each successive revolution of the imaging drum. Column 11, 620, is created by imaging with a translation speed which is too fast, causing the printing head moving too far inbetween each successive revolution of the imaging drum resulting in a white space error or light image inbetween each swath. Columns 2 through 11-1 use successively faster translation speeds. The Column which produces the least amount of banding, 630, has the best match between the printhead width, printhead line spacing and the translation. The Pseudo19 image to beat against the 18 writing channels in a Kodak Approval PS. We change translation movement and image the pattern. The best translation movement indicates the position which minimizes beating between the 18 channels and the move. The beat pattern also indicates whether the printhead is too steep or too shallow. This is similar to the musical tuner indicating that the musical note is too sharp or too flat.

Figure 7:
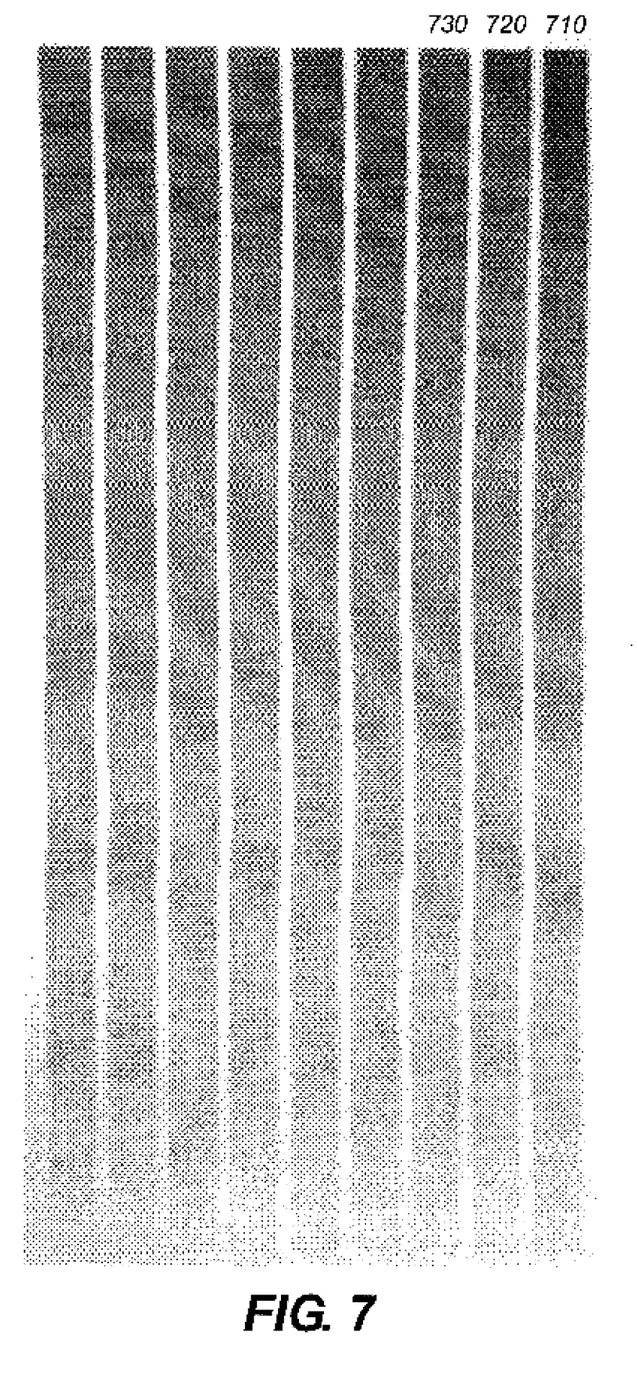
FIG. 7 Pseudo 29 Image on Kodak Approval XP with Perturbations of Channel Power Levels.

In another preferred embodiment we perturb the balance of the channels. We judge the beat pattern to select the best balance. FIG. 7 shows nine Pseudo29 Images each with a different balance imaged on an Approval XP printer beat against 28 writing channels. Note FIG. 7 is a simulation with the adjustment set to a large amount to emphasize the effect. In actual practice the adjustment amount is on the order of 1 to 10 mJ/cm$^2$ out of an average exposure of 180 mJ/cm$^2$ when writing onto Kodak Approval Cyan Donor, DC02 Kodak Catalog Number 105 5003, with a Kodak Approval XP Direct Digital Color Proofer. The amount of perturbation and the average exposure will be different for other medias and colors. Column 9, 710, has all the writing channels set to the same power level. Column 8, 720, has channels 1 through 7 at reduced power. Column 7, 730 has channels 8 through 14 at reduced power. Similarly each column has a subset of channels set to different power levels. The column with the least amount of banding has the lasers set to the most optimum level relative to each other.

In another preferred embodiment, we perturb the angle of the printhead. We set the angle of the printhead to obtain the least amount of banding. The beat pattern indicates whether the printhead is too steep or too shallow. FIG. 5 shows the Pseudo29 Image printed on Approval XP with 28 writing channels and different Printhead Angle settings. Column 1, 810, has the printhead angle set too steep resulting in a white space error in-between each swath. Column 12, 820, has the printhead set too shallow resulting in a dark space error in-between each swath. Column 3, 830, has the least amount of banding indicating that this head angle position most closely matches the angle of the printhead, the line to line spacing within the printhead, the power levels within the printhead, and the translation move.

Figure 8:
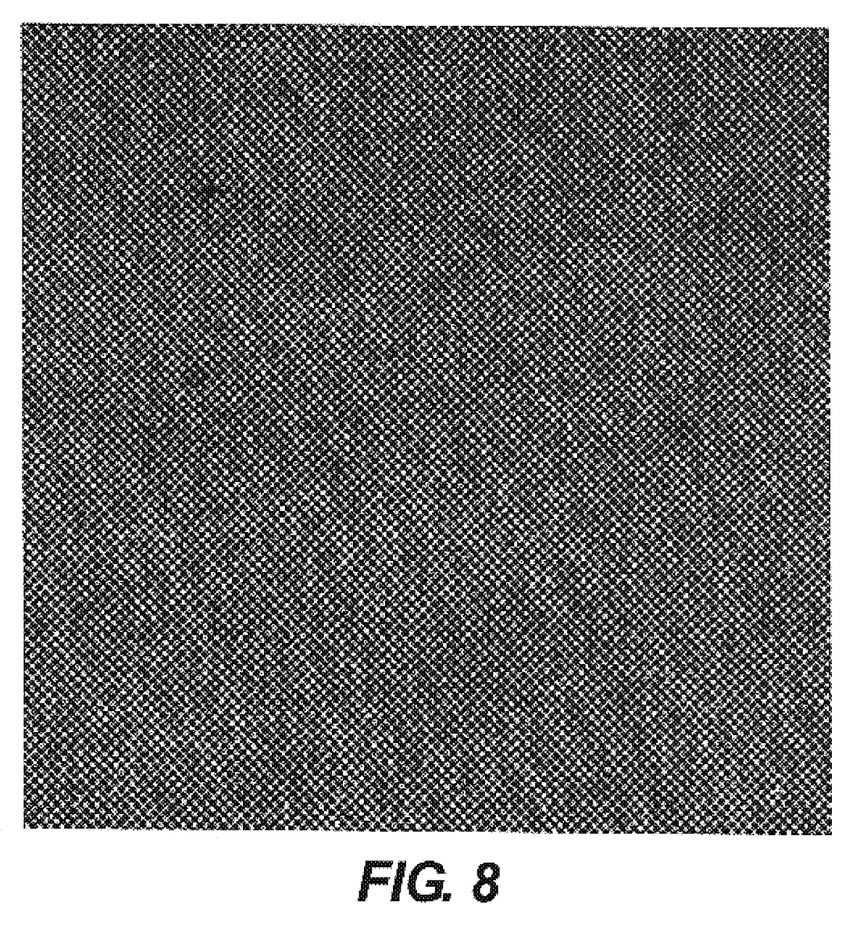
FIG. 8 Magnified 33% tint of black imaged with 27 channels at 199.56 line screen.
Figure 9:
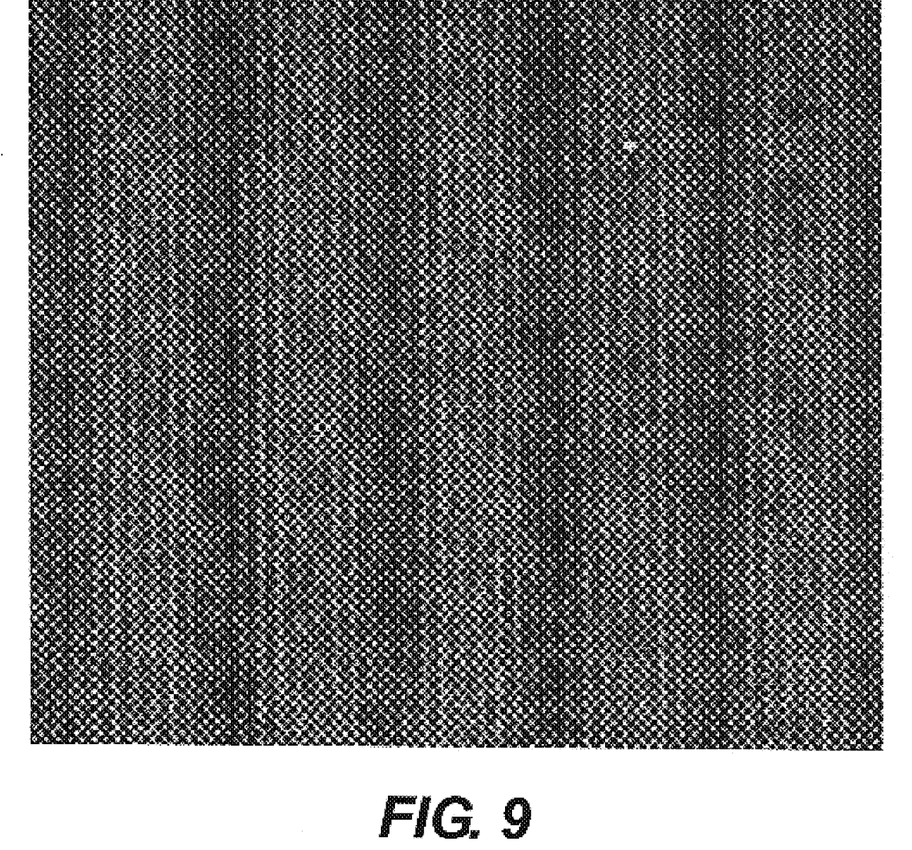
FIG. 9 Magnified 33% tint of black imaged with 28 Channels at 199.56 line screen.

Another preferred embodiment shown in FIGS. 8 and 9 uses a 33% halftone tint printed at 100 dots/mm (2540 dpi) writing resolution and screened at 7.857 line/mm (199.56 lpi) at 45 degrees. In both figures, Channel 10 has been disconnected to amplify the effect. FIG. 8 shows an acceptable Black halftone screen imaged with 27 writing channels. FIG. 9 shows a really bad banding in Black when imaged with 28 writing channels. We selected the number of channels for each halftone screen and angle to minimize the beating in the image. U.S. Pat. No. 5,329,297 describes changing number of writing channels in a printer to eliminate banding in a halftone print. The unplugged channel simulates a worst case condition of having one channel completely fail.

Turning off one channel creates a large error impulse at the rate of once per set of writing channels. From systems theory one skilled in the art will recognize that when an impulse 67 (x), is input into a system H(x), the output response is the system frequency response H($\omega$). In our system x is a spatial distance measured in mm, and $\omega$ is a spatial frequency cyc/mm. The system H(x) is our image processor and the system frequency response H($\omega$) is the frequency response of our image processor to the input 67 (x). The corresponding image produced with one channel off is a picture which is the Impulse Response Proof of the printer. This picture is important because it shows us how the image processor will respond to an error input at a given spatial frequency. Given a specific image processor A, which is creating defective images B, we could compare sets of images made with known error impulses to the defective images B to uncover the source of the problem in image processor A.

One skilled in the art will recognize that we may simulate unplugging a channel by lowering the power level or setting the data to a given channel to off. One skilled in the art will recognize that we may also increase power to one or more channels as a method of perturbing the machine to increase the signal of the beating. The combination of perturbing the machine and printing a pattern which beats against the component of the machine amplifies the beat pattern making it easier to discern the optimum settings or conditions for the component being tested.

Figure 10A:
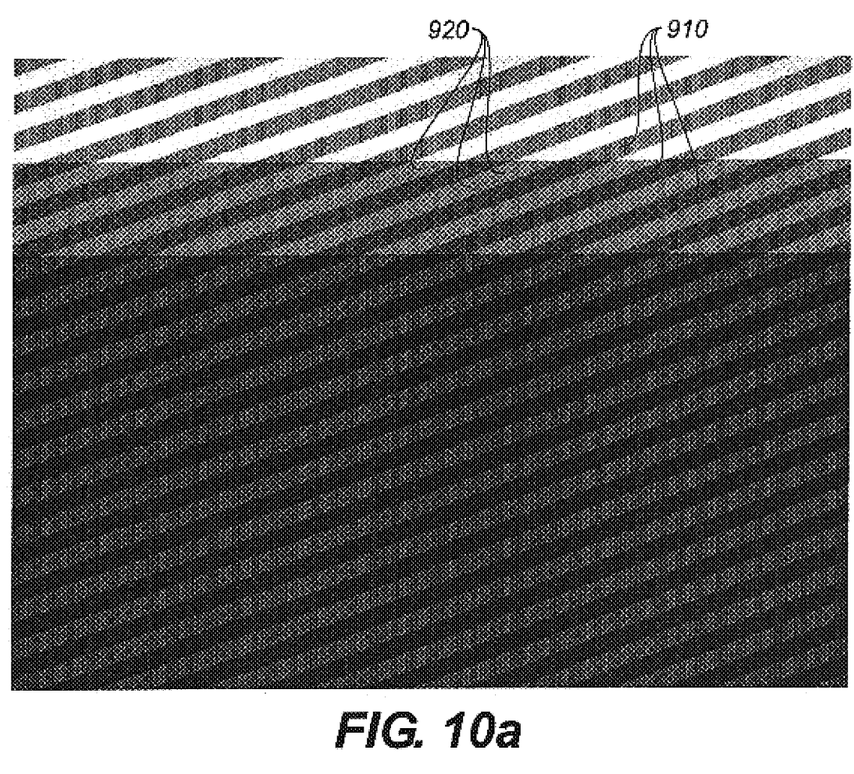
FIGS. 10a–10b show an image made by driving a subset of the channels with a function generator which is beating against the rate of the drum.
Figure 10B:
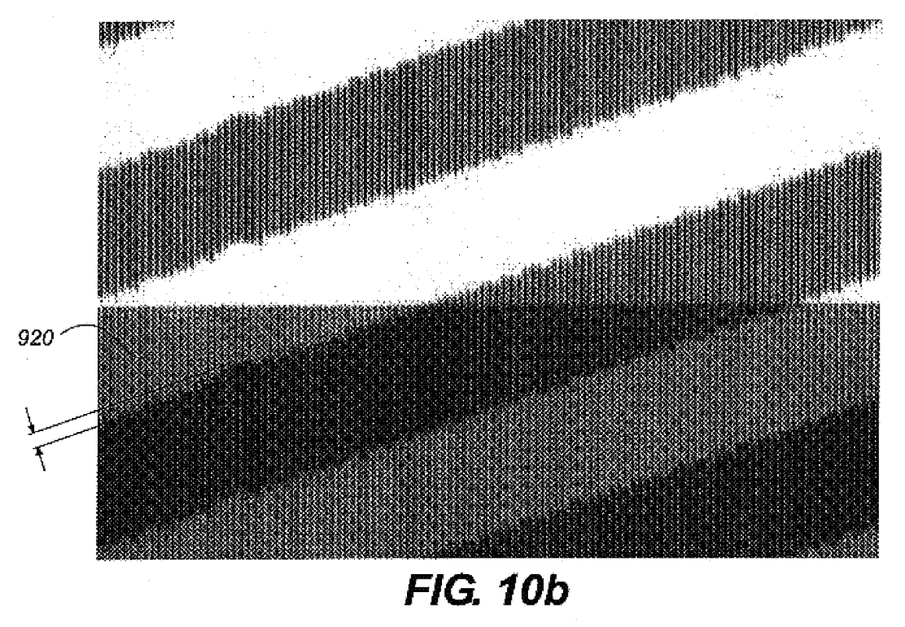

Another preferred embodiment shown in FIG. 10a creates an image with some channels driven by a function generator at a rate that beat against the imaging drum. The other channels are driven with the normal data source. The function generator is tuned to a frequency which beats slowly against the drum and creates the diagonal bands in FIG. 10, 910. The resulting image beats against the drum frequency producing slowly moving, not quite horizontal, lines. Deviations in the straightness of the horizontal lines indicate an error between the drum, printing head translation, and the function generator. The magnitude of the deviations indicate the magnitude of the positional error. The spatial distribution of the deviations indicates the spatial distribution of the position error. The direction of the deviation indicates whether the drum is ahead or behind the lead screw. The perturbation in the diagonal bands, 920, divided by the imaging drum circumference is the error in imaging drum position relative to the printhead translation and the function generator. FIG. 10b shows a peak to peak deviation of 0.05% of the imaging drum circumference.

This small collection of examples of the invention is not exhaustive. One skilled in the art may recognize many more possible applications where a pattern may be designed to beat against one or more components of the printer. For instance patterns may be designed to beat against the lead screw pitch, or the poles in a stepper motor driving the lead screw, or the poles in a stepper motor driving a drum, or the poles in a stepper motors driving an XY Stage. Patterns may be designed to beat against the switching frequencies of a switching power supply. For a flat bed type printing application patterns may be designed to beat against gears, bearings, and stepper motors. In an ink jet printer patterns may be designed to beat against the number of nozzles in the ink jet printhead.

One skilled in the art will also recognize that the output image may be used to evaluate the sensitivity to one or more components in the printer. For instance the pseudo29 image may be imaged with 28 writing channels while perturbing the exposure on individual channels. This results in exposure errors of less than 20 mJ/cm$^2$ which is usually not objectionable for a single channel exposure errors. This method can be used to measure the allowable exposure error for groups of multiple channels.

The invention has been described in detail with particular reference to certain preferred embodiments thereof, but it will be understood that variations and modifications can be effected within the scope of the invention.

10. Image forming apparatus
12. Image processor housing
14. Image processor door
16. Ejection chute
18. Waste bin
20. Media stop
32. Termal print media
34. Colorant donor material
50a. Lower sheet material tray
52b. Lower media lift cam
52b. Upper media lift cam
54a. Lower media roller
54b. Upper media roller
56. Media guide
58. Media guide rollers
60. Media staging tray
80. Transport mechanism
100. Media carousel
110. Media drive mechanism
112. Media drive rollers
120. Media knife assembly
122. Media knife blades
180. Color binding assembly
182. Entrance door
184. Media exit door
200. Lathe bed scanning subsystem
202. Lathe bed scanning frame
204. Entrance passageway
206. Translation bearing rods
208. Translation bearing rods
218. Rod support bores
220. Translation stage member
250. Lead screw
252. Threaded shaft
254. Lead screw drive nut
258. Linear drive motor -continued 300. Vacuum imaging drum
400. Laser assembly
402. Laser
404. Fiber-optic cables
406. Distribution block
458. Outside wall
500. Printhead
510. First patch
520. Second patch
530. Third patch
540. Fourth patch
550. 29$^{th}$ patch
610. Column 1 of FIG. 6
620. Column 2 of FIG. 6
630. Least amount of banding of FIG. 6
710. Column 9 of FIG. 7
720. Column 8 of FIG. 7
730. Column 7 of FIG. 7
810. Column 1 of FIG. 5
820. Column 2 of FIG. 5
830. Column 3 of FIG. 5
910. Diagonal bands of FIG. 10a
920. Diagonal bands of FIG. 10b

What is claimed is:

1. A method of tuning a printer by printing a pattern which beats against a component within said printer comprising the steps of:
    designing a first pattern which has a spatial frequency which is different from a first component spatial frequency;
    printing said first pattern;
    measuring banding in said first pattern;
    adjusting a characteristic of said first component to minimize said banding;
    wherein said first component is a printhead; and
    wherein said characteristic is a magnification of said printhead.

2. A method of tuning a printer as in claim 1 wherein said difference between said pattern spatial frequency and said first component spatial frequency results in banding which falls in the range of 0.04 to 4 cycles per mm.

3. A method of tuning a printer according to claim 1 comprising the additional step of printing a second pattern which beats against a second component of said printer.

4. A method of tuning a printer according to claim 3 wherein a characteristic of said second component is adjusted to eliminate said banding.

5. A method of tuning a printer according to claim 3 wherein said second component is a drum motor.

6. A method of tuning a printer by printing a pattern which beats against a component within said printer comprising the steps of:
    designing a first pattern which has a spatial frequency which is different from a first component spatial frequency;
    printing said first pattern;
    measuring banding in said first pattern;
    adjusting a characteristic of said first component to minimize said banding; and
    wherein said first component is a translation motor.

7. A method of tuning a printer by printing a pattern which beats against a component within said printer comprising the steps of:
    designing a first pattern which has a spatial frequency which is different from a first component spatial frequency;
    printing said first pattern;
    measuring banding in said first pattern;
    adjusting a characteristic of said first component to minimize said banding; and
    wherein said first pattern beats against a number of channels in said printhead, simultaneously printed by said printer while adjusting a translation amount of said printhead.

8. A method of tuning a printer by printing a pattern which beats against a component within said printer comprising the steps of:
    designing a first pattern which has a spatial frequency which is different from a first component spatial frequency;
    printing said first pattern;
    measuring banding in said first pattern;
    adjusting a characteristic of said first component to minimize said banding; and
    wherein said first pattern beats against a translation lead screw pitch of said printer.

9. A method of tuning a printer by printing a pattern which beats against a component within said printer comprising the steps of:
    designing a first pattern which has a spatial frequency which is different from a first component spatial frequency;
    printing said first pattern;
    measuring banding in said first pattern;
    adjusting a characteristic of said first component to minimize said banding; and
    wherein said first pattern beats against poles in a stepper motor driving a translation assembly of said printer.

10. A method of tuning a printer by printing a pattern which beats against a component within said printer comprising the steps of:
    designing a first pattern which has a spatial frequency which is different from a first component spatial frequency;
    printing said first pattern;
    measuring banding in said first pattern;
    adjusting a characteristic of said first component to minimize said banding; and
    wherein said first pattern beats against revolutions of a drum of said printer.

* * * * *